United States Patent
Le Mer et al.

(10) Patent No.: US 8,942,980 B2
(45) Date of Patent: Jan. 27, 2015

(54) METHOD OF NAVIGATING IN A SOUND CONTENT

(75) Inventors: Pascal Le Mer, Perros-Guirec (FR); Delphine Charlet, Lannion (FR); Marc Denjean, Paris (FR); Antoine Gonot, Le Vesinet (FR)

(73) Assignee: Orange, Paris (FR)

(*) Notice: Subject to any disclaimer, the term of this patent is extended or adjusted under 35 U.S.C. 154(b) by 728 days.

(21) Appl. No.: 13/025,372

(22) Filed: Feb. 11, 2011

(65) Prior Publication Data

US 2011/0311059 A1    Dec. 22, 2011

(30) Foreign Application Priority Data

Feb. 15, 2010 (FR) .................................. 10 51030

(51) Int. Cl.

| | |
|---|---|
| G10L 15/00 | (2013.01) |
| G10L 15/06 | (2013.01) |
| G06F 17/00 | (2006.01) |
| H04R 5/00 | (2006.01) |
| G11B 27/10 | (2006.01) |
| G06F 17/30 | (2006.01) |
| G11B 19/02 | (2006.01) |
| G11B 27/28 | (2006.01) |
| G10L 15/26 | (2006.01) |

(52) U.S. Cl.
CPC ........ *G11B 27/105* (2013.01); *G06F 17/30775* (2013.01); *G11B 19/025* (2013.01); *G11B 27/28* (2013.01); *G10L 15/26* (2013.01)
USPC .......... 704/251; 704/E15.001; 700/94; 381/1; 381/17; 381/18

(58) Field of Classification Search
USPC ...................... 381/1, 17, 18; 700/94; 715/727; 704/251, E15.001
See application file for complete search history.

(56) References Cited

U.S. PATENT DOCUMENTS

| 5,031,113 A | 7/1991 | Höllerbauer |
| 6,360,237 B1* | 3/2002 | Schulz et al. ................. 715/255 |
| 6,446,041 B1* | 9/2002 | Reynar et al. ................. 704/260 |
| 7,793,230 B2* | 9/2010 | Burns et al. .................... 715/787 |
| 7,801,910 B2* | 9/2010 | Houh et al. .................... 707/765 |
| 8,433,431 B1* | 4/2013 | Master et al. ................... 700/94 |
| 2002/0178002 A1 | 11/2002 | Boguraev et al. |
| 2008/0005656 A1* | 1/2008 | Pang et al. ................. 715/500.1 |
| 2008/0140385 A1* | 6/2008 | Mahajan et al. ................. 704/9 |
| 2009/0228799 A1* | 9/2009 | Verbeeck et al. ............. 715/727 |
| 2010/0050064 A1* | 2/2010 | Liu et al. ....................... 715/202 |

FOREIGN PATENT DOCUMENTS

| EP | 0 877 378 A2 | 11/1998 |
| WO | WO 2008/067116 A1 | 6/2008 |

* cited by examiner

*Primary Examiner* — Vivian Chin
*Assistant Examiner* — David Ton
(74) *Attorney, Agent, or Firm* — Drinker Biddle & Reath LLP

(57) ABSTRACT

A method of navigating in a sound content wherein at least one key word is stored in association with at least two positions representative of said key word in the sound content, and wherein the method comprises: a step of displaying a representation of the sound content; during playback of the sound content, a step of detecting a current extract representative of a key word stored at a first position; a step of determining at least one second extract representative of said key word and a second position as a function of the stored positions; and a step of highlighting the position of the extracts in the representation of the sound content.

The invention also relates to a system adapted to implement the navigation method.

12 Claims, 4 Drawing Sheets

|     | -S1- | -S2- | -S3- | -S4- | -S5- | -S6- | -S7- |
|-----|------|------|------|------|------|------|------|
| MC1 | P11  |      |      |      | P12 P13 |   |      |
| MC2 |      | P21  |      |      |      |      |      |
| MC3 |      | P31 P32 |   | P33  |      |      |      |
| MC4 | P41  |      | P42  |      |      | P43  |      |
| ... |      |      |      |      |      |      |      |
| MCi |      |      |      |      |      |      |      |
| ... |      |      |      |      |      |      |      |
D1
-Y-
Fig. 4
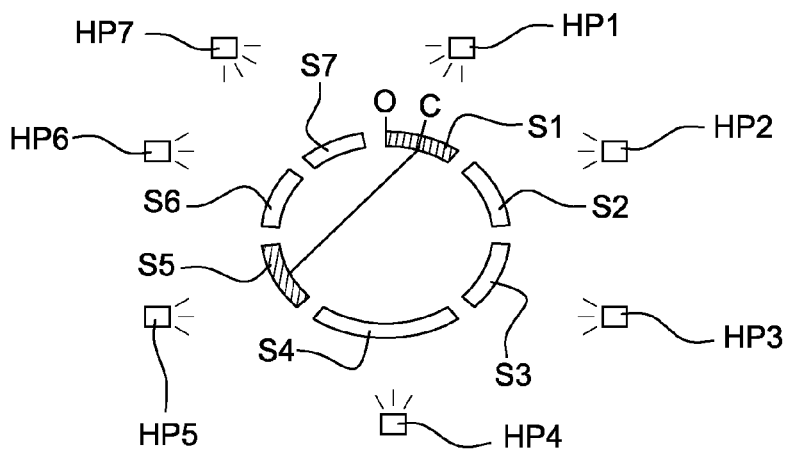
Fig. 5a
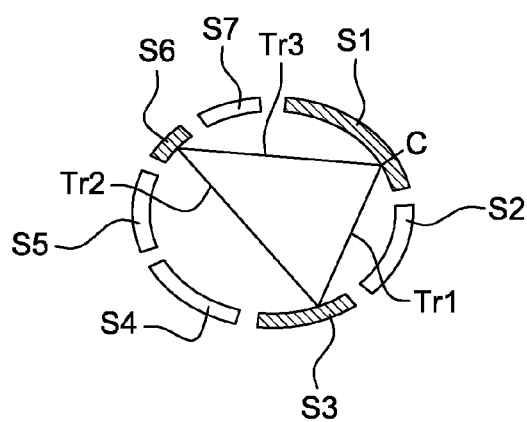
Fig. 5b

METHOD OF NAVIGATING IN A SOUND CONTENT

CROSS-REFERENCE TO RELATED PATENT APPLICATION

This application claims the benefit of French Patent Application No. 10 51030, filed on Feb. 15, 2010, in the French Institute of Industrial Property, the entire contents of which is incorporated herein by reference.

FIELD OF THE INVENTION

The invention relates to a method and a system for navigating in a voice-type sound content.

BACKGROUND

Acquiring knowledge of information contained in a speech corpus requires listening to the corresponding complete sound signal. With a large corpus, this operation can be very time-consuming.

Techniques for temporal compression of a sound file such as acceleration, suppression of signal portions of no utility (for example pauses), etc. do not save much time given that the content is no longer intelligible once the compression factor reaches a value of 2.

Known techniques make it possible to transcribe an audio signal into text. The text obtained in this way may then be displayed, e.g. on a computer screen, and read by a user. Since reading text is faster than listening, users can thus obtain information they deem pertinent more quickly. However, sound also carries information that is difficult to quantify and to represent by images. Such information includes the expressiveness, gender and personality of the speaker. The text file obtained by this method does not contain this information. Moreover, automatic transcription of natural language generates numerous transcription errors and the text obtained may be difficult for the reader to understand.

Patent application FR 08 54340 filed on Jun. 27, 2008 discloses a method of displaying information relating to a sound message in which the sound message is displayed in the form of a chronological visual representation and in which key words are displayed in text form as a function of their chronological position. The key words displayed give viewers information about the content of the message.

That method makes it possible to assess the gist of a message by visual inspection while offering the possibility of listening to the whole message or part of the message.

That method is not suited to a large sound corpus. The number of words displayed is limited, in particular by the size of the screen. Applying that method to a large corpus makes it possible to display only a restricted number of words that are not representative of the content as a whole. Consequently, it does not give a real insight about the content of the corpus.

A zoom function makes it possible to obtain more details, in particular more key words, over a smaller portion of a message. To assess the gist of the message the user must scan the whole of the document, i.e., zoom in on various parts of the content.

Applying that zoom function to a large number of sections of the content is time-consuming and laborious because it requires many manipulations on the part of the user.

Moreover, if the user wishes to view a previously-viewed section, at least some of the zooming operations previously-effected need to be repeated.

Thus navigating in a large voice content is not easy.

There is therefore a need to be able to access, quickly and simply, pertinent information of a large voice content.

SUMMARY

According to an embodiment, the invention provides a method of navigating in a sound content, wherein at least one key word is stored in association with at least two positions representative of said key word in the sound content, and wherein the method includes:
  a step of displaying a representation of the sound content;
  during playback of the sound content, a step of detecting a current extract representative of a key word stored at a first position;
  a step of determining at least one second extract representative of said key word and a second position as a function of the stored positions; and
  a step of highlighting the position of the extracts in the representation of the sound content.

Thus, while listening to a voice content, a graphical interface highlights the various locations of a spoken key word in the content or representative of the extract. The user can thus easily identify portions of the content that are of interest and can request to listen to specific portions.

In one particular implementation of the invention, the navigation method further includes, following reception of a user request, a step of stopping the sound being played back followed by a step of playing back the content from the second position.

Users are thus able to navigate quickly in the content as a function of their interests, without having to listen to the whole of the content.

According to a particular feature of the navigation method, playback of the current extract is followed by a step of playing back at least one determined extract.

The user therefore has the possibility of listening in succession to the various extracts representative of the same key word. This kind of targeted navigation saves the user time.

In one particular implementation of the navigation method, the sound content is represented in the form of a circle, a position on this circle representing a chronological position in the content, and the highlighting step includes a step of displaying a link between the first position and the second position.

The circle is a shape that is perfectly suited to displaying the correspondence between a plurality of extracts of a content. This shape makes it possible for the links between the positions of the extracts to be represented in a manner that is simple, concise, and clear.

In one particular implementation of the navigation method in which the content is divided into segments, the representation of the content is a segmented representation and the highlighting step includes highlighting the segment containing the current extract and highlighting at least one segment containing at least one second extract.

Subdivision into segments makes it possible to subdivide the content in a natural manner, for example into paragraphs, chapters, or subjects covered.

According to one particular feature, a represented segment is selectable via a user interface.

Subdivision into segments thus facilitates user navigation in the sound content.

In one particular implementation of the navigation method, the content is played back on a set of loudspeakers spaced apart around a circle, the current extract is played back on a first loudspeaker of the set of loudspeakers, and a determined extract is played back simultaneously on a second loudspeaker of the set, the loudspeakers being selected as a function of the position of the extract on the circle representing the sound content.

This spatial (surround sound) effect thus enables the user to hear, in addition to the played back sound content, an extract of the content to which the same key word relates. The user thus has an insight into the content of the particular extract and is able, as a function of the elements heard, to decide whether or not to request to hear the extract on a single loudspeaker. The effect obtained is comparable to that experienced by a person in the presence of two speakers talking at the same time.

Surround sound makes possible for a plurality of audio signals to be played back simultaneously while retaining some degree of intelligibility for each of them.

The differences in the spatial positions of sounds facilitate selective listening. When a plurality of sounds are audible simultaneously, the listener is in a position to focus attention on only one of them.

Furthermore, if only two sound extracts are audible simultaneously, the differences in spatial position can also facilitate shared listening. Consequently greater comfort, reduced workload and improved intelligibility of the content during simultaneous listening may be expected.

The listener identifies an element on the screen more easily if a sound indicates where that element is located. The fact that the extracts are played back on loudspeakers arranged spatially in relationship corresponding to the representation of the sound content facilitates understanding the played back contents.

Surround sound is used here to play back two parts of a sound content simultaneously at two distinct azimuths, for example a first part of the content in one direction in space on a first loudspeaker and another part of the content in another direction in space, for example on a second loudspeaker, thereby giving the user a quick idea of the second part of the content. The user is then able to navigate in the content and to listen more attentively to passages that attract attention.

According to one particular feature, the loudspeakers are virtual loudspeakers of a binaural playback system.

Thus the surround sound effect is obtained from an audio headset connected to a playback device, for example.

According to one particular feature, the sound level of the signal emitted by the first loudspeaker is greater than the sound level of the signal emitted by the second loudspeaker.

Thus what is currently being played back remains the principal sound source.

The invention also provides a device for navigating in a sound content, wherein the device includes:
  means for storing at least one key word in association with at least two positions representative of said key word in the sound content;
  means for displaying a representation of the sound content;
  means for detecting, during playback of the sound content, a current extract representative of a key word stored at a first position;
  means for determining at least one second extract representative of said key word and one second position as a function of the stored positions; and
  means for highlighting the position of the extracts in the representation of the sound content.

The invention further provides a navigation system comprising a playback device as described above and at least two loudspeakers.

The invention finally provides a computer program product comprising instructions for executing the navigation method as described above when it is loaded into and executed by a processor.

BRIEF DESCRIPTION OF THE DRAWINGS

Other particular features and advantages of the invention become apparent in the course of the following description of embodiments of the invention given by way of non-limiting example and with reference to the appended drawings in which:

FIG. 4 shows an example of metadata associated with a sound content in a first implementation of the invention;

FIGS. 5a and 5b are examples of the representation of a voice content obtained by means of a navigation method of a first particular implementation of the invention;

One embodiment of the invention is described below with reference to FIGS. 1 to 3.

Figure 1:
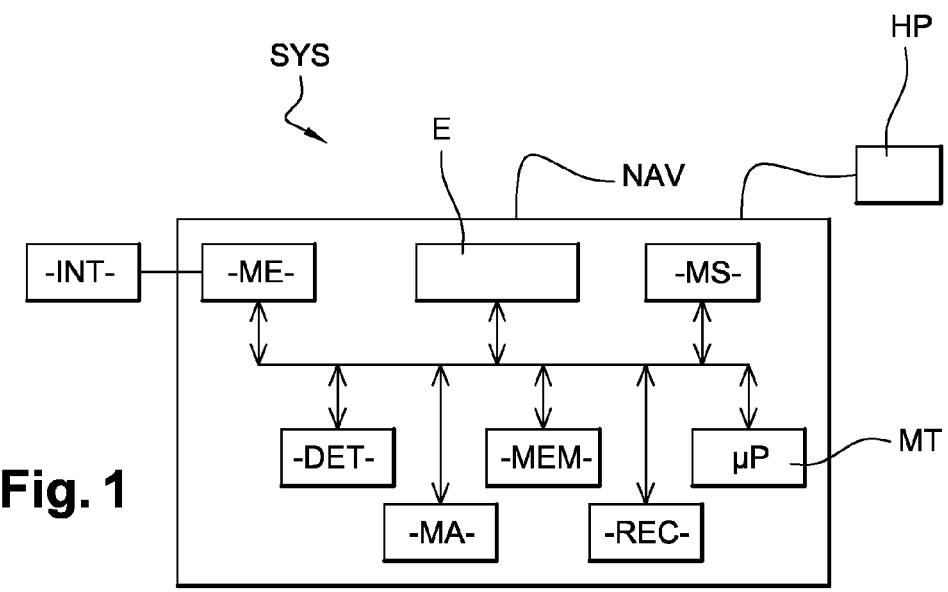
FIG. 1 shows a navigation system of one embodiment of the invention.
Figure 2:
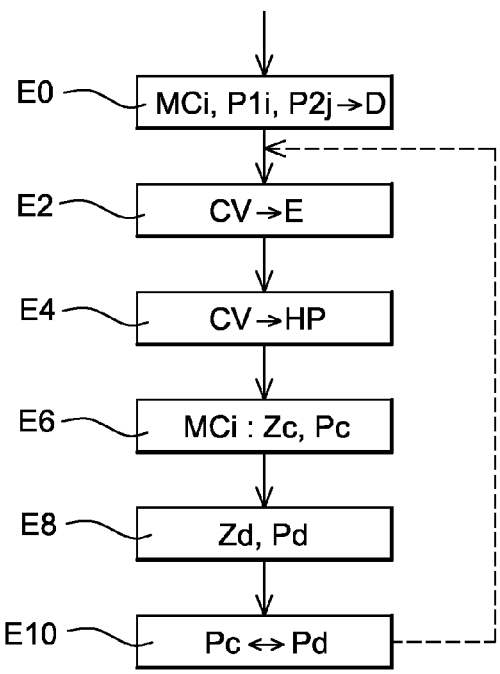
FIG. 2 is a flowchart showing the steps of a navigation method used in a navigation system of one implementation of the invention.

FIG. 1 represents a navigation system SYS of one embodiment of the invention.

DETAILED DESCRIPTION

The system SYS comprises a navigation device NAV and a sound playback system HP.

The sound playback system HP comprises loudspeaker-type sound playback means, for example.

In the embodiment shown here, the playback system HP is separate from and connected to the device NAV.

Alternatively, the sound playback system HP is incorporated into the device NAV.

The device NAV is a PC, for example.

The device NAV may typically be incorporated into a computer, a communications terminal such as a mobile telephone, a TV decoder connected to a television, or more generally any multimedia equipment.

This device NAV includes a processor unit MT provided with a microprocessor and connected to a memory MEM. The processor unit MT is controlled by a computer program PG. The computer program PG includes program instructions adapted to execute in particular a navigation method of an implementation of the invention described below with reference to FIG. 2.

The processor unit MT is able to receive instructions from a user interface INT via an input module ME, for example a computer mouse or any other means enabling the user to point on the display screen.

This device NAV also includes a display screen E and a display module MA driving the display screen E.

It also includes a sound playback module MS for playing back a voice content on the sound playback system HP.

The device NAV also includes a key word detector module REC and a module DET for determining sound extracts representative of key words.

A sound content CV and associated metadata D are stored in the memory MEM.

The metadata is stored in the memory MEM in the form of a metadata file, for example.

The sound content CV is an audio content containing at least one speech signal.

An implementation of the method of navigation in the system SYS is described below with reference to FIG. 2.

During a preliminary indexing step E0, key words MCi in the voice content CV are determined. Here a key word represents a word or a set of words representative of at least two content extracts. A key word is a content identifier.

Each identified key word MCi is then stored in a metadata file D of the memory MEM in association with at least two positions P1$i$, P2$j$ of the key word MCi in the sound content CV.

For example, the metadata file D contains a key word MC1 associated with a first position P11 and a second position P12 and a key word MC2 associated with a first position P21 and a second position P22.

For example, key words are determined by a method consisting in converting the sound content into a text transcription using a standard speech-to-text algorithm effecting thematic segmentation and extracting key words in the segments.

Thematic segmentation is effected, for example, by detecting in the curve representing the audio signal the content of peaks representing the similarity of two words or groups of words. One example of such a method of measuring the degree of similarity is described in a 1994 document by G. Salton, J. Allan, C. Buckley, and A. Singhal entitled "Automatic analysis, theme generation and summarization of machine-readable texts".

The extraction of the key words in the segments is based on the relative frequency on the words or groups of words in the segment, for example.

The preliminary step E0 is executed only once for the sound content CV.

Alternatively, the preliminary step E0 is determined by an indexing device (not represented) and the indexing device sends the metadata file D associated with the file CV to the device NAV, for example via a telecommunications network.

Another alternative is for the metadata D to be determined by manual editorial analysis of the sound content CV by an operator.

During a step E2, the display module MA displays a representation of the voice content CV on the screen E.

Figure 3:
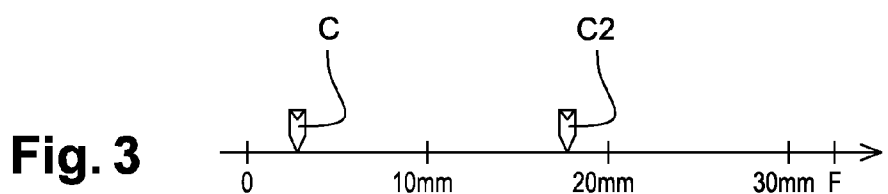
FIG. 3 is an example of the representation of a voice content obtained using a navigation method of one implementation of the invention.

FIGS. 3 and 5$a$ show examples of representations of the voice content CV.

In the implementation described with reference to FIG. 3, the voice content CV is represented by a horizontal chronological time axis. The beginning of the content is represented by the mark O and the end of the content is represented by the mark F. Intermediate marks indicate the time calculated from the start O.

During a step E4, the module MS causes the voice content CV to be played back from the mark O via the sound playback system HP.

Alternatively, playback may be started from elsewhere in the voice content.

A cursor C indicates the current playback position.

During a step E6, the detection module REC detects that a key word MCi present in the metadata file D is spoken or that the current extract Zc being spoken is representative of the key word MCi. The position Pc of the current extract Zc corresponds to one of the positions stored in association with the key word MCi in the metadata file D.

For example, the current extract Zc at the position P11 is representative of the key word MC1.

This detection step E6 compares the current position Pc of the cursor C with the position stored in the metadata file D, for example.

An extract is representative of a key word if it contains that key word or if the extract and the keyword are derivatives of the same lemma, the lemma being the form of a word that is found in a dictionary entry (verb in the infinitive, singular noun, masculine singular adjective).

For example, "eaten" and "eating" are derived from the lemma "eat".

Alternatively, an extract is representative of a key word if it has the same meaning in the context.

For example, "Detroit" means "the US automotive industry" if the context is about industry rather than geography.

During a step E8, by reading the metadata file D, the determination module DET determines at least a second extract Zd representative of the key word MCi and a position Pd for each second extract Zd determined. A position Pd of an extract Zd represents a second position.

In the particular example where the key word MC1 represents the current extract Zc at the position P11, a single second extract Zd is determined and its position is P12.

Then, during a step E10, the position Pc of the current extract Zc and position Pd of the second extract or extracts Zd are highlighted on the screen E by the display means MA, for example by displaying them in a different color or extra bright.

In the particular example described, the positions P11 and P12 are highlighted.

Alternatively, the key word MC1 is also displayed on the screen E.

Accordingly, the user hearing an extract representative of the key word MC1 is alerted to the fact that another extract representative of the same key word MC1 is present at another position in the sound content CV.

The user may then continue to listen to the sound content or request playback of the content from the position Pd or from a position P preceding the position Pd in order to hear the context of the second extract Zd.

If the user continues to listen, the steps E2 to E10 are repeated for the next key word, for example the key word MC2.

The method may also provide for successive playback of the extracts so determined either automatically or at the request of the user or for simultaneous playback of the extracts so determined, for example on a surround sound playback system as described below with reference to FIG. 5$a$.

A first particular implementation is described below with reference to FIGS. 4 and 5$a$.

In this implementation, the sound playback system HP comprises a set of seven loudspeakers HP1, HP2, . . . , HP7 connected to and distributed spatially around the device NAV.

For example, the loudspeakers are distributed around the device in a virtual circle.

Alternatively, the system SYS comprises a different number of loudspeakers.

In this implementation, the sound content CV is subdivided into segments, for example seven segments S1, S2, . . . , S7. A segment is a sub-portion of the content, for example a thematic sub-portion.

In the implementation described, a metadata file D1 is stored in memory. In this metadata file D1, a position corresponds to a segment identifier and to a chronological position relative to the beginning of the segment.

FIG. 4 represents an example of a metadata file D1 for the voice content CV.

The key word MC1 is stored in association with a position P11 in the segment S1 and with two positions P12 and P13 in the segment S5, for example. The key word MC3 is stored in association with two positions P31 and P32 in the segment S2 and with one position P33 in the segment S4, for example.

The same key word may be represented in the same segment either only once or several times.

FIG. 5a shows one example of representation of the voice content CV.

The voice content CV is represented by a chronological time axis that has the shape of a circle. The segments S1 to S7 are distributed on the circle. The beginning of the content is represented by the mark O situated in the segment S1.

The length of the segments is proportional to their sound playback duration, for example.

During sound playback, the loudspeaker by which the sound content CV is played back is the loudspeaker associated with the played back segment.

A loudspeaker is associated with a segment as a function of the position of the segment on the circle displayed on the screen, the position of the loudspeaker, and the spatial distribution of the loudspeakers of the set of loudspeakers.

In the implementation described here where the number of segments is equal to the number of loudspeakers, each loudspeaker is associated with only one segment.

Alternatively, a loudspeaker is associated with a plurality of segments.

A further alternative is for a segment to be associated with a plurality of loudspeakers. This is particularly suitable if one of the segments is longer than the others.

During playback of a segment, the key words of the segment are read in memory in the metadata file D1 and displayed on the screen E.

The current segment, i.e. the segment being played back, is highlighted on the screen E, for example using a particular color, the other segments being another color.

A cursor C indicates the current playback position on the circle.

FIG. 5a shows an example of representation in which the cursor C is at position P11 of the segment S1.

The currently spoken extract Zc is then representative of the key word MC1.

Two extracts Z2 and Z3 situated at respective positions P12 and P13 of the section S5 are determined. The extracts Z2 and Z3 representative of the key word MC1 represent second extracts.

Here the positions P12 and P13 in the section S5 represent second positions.

As shown in FIG. 5a, the segment S5 associated with the extract Z2 is highlighted using a particular color, extra brightness, blinking, etc. and a line is displayed between the position P11 in the segment S1 of the current extract Zc and the position P12 in the segment S5 of the second extract Z2.

Thus the user hearing the key word MC1 is alerted visually to the fact that a similar key word is present at the position P12 of the segment S5.

In the implementation described here, if a plurality of extracts corresponding to the key word are represented in the same other segment, only the position of the first extract is retained.

In parallel with the playback of the sound content, the second extract Z2 is played back on the loudspeaker HP5 associated with the segment S5 using a surround sound technique.

Thus the two extracts Zc and Z2 are located at two different positions in the sound space.

The user may then continue to listen to the sound content CV or request playback of the content CV from the position P12 of the segment S5 or from another position in the file, for example a position P preceding the position P12 in order to hear the context of the second extract Z2.

Such navigation in the content may be effected by placing the cursor, by a circular movement of the finger, by pointing directly to a segment or by using skip functions selected by means of dedicated buttons.

The cursor enables users to determine the precise position from which they wish to hear the voice content.

A circular movement of the finger commands fast forwarding or fast rewinding within the content.

An example of a graphical interface offering easy navigation is described below with reference to FIG. 8.

The user can also command acceleration of listening by selective listening. For example, it is possible to obtain playback of only those sentences that contain key words or even of only the key words.

FIG. 5b shows one example of the representation of the voice content CV if the currently spoken extract Zc is representative of the key word MC4. Extracts Z3 and Z4 respectively at the position P42 in the segment S3 and at the position P43 in the segment S6 are then determined.

The current segment S1 and the segments S3 and S6 are highlighted, for example extra bright. Three lines Tr1, Tr2, and Tr3 highlight the position of the extracts Zc, Z3, and Z4.

A second particular implementation of the navigation method used in the system SYS is described below with reference to FIGS. 6 and 7.

Figure 6:
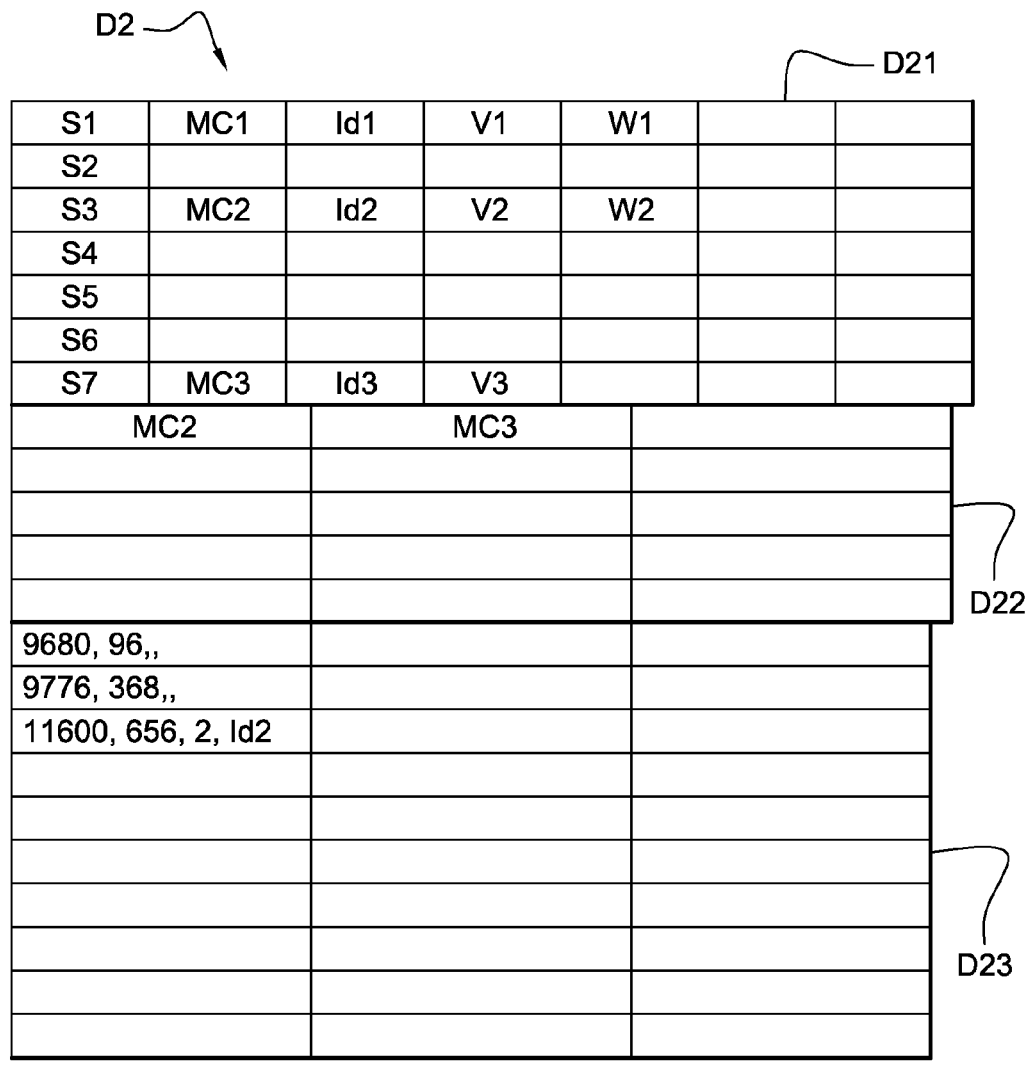
FIG. 6 shows an example of metadata associated with a sound content in a second implementation of the invention.

FIG. 6 represents by way of example a second metadata file D2 for the voice content CV.

In this example, the metadata file D2 comprises three parts D21, D22, and D23.

In each segment of the voice content CV, the first part D21 contains the key words representative of the segment and, in association with each key word, an identifier of the key word in the segment and at least two positions. Here one position is the position of a word or a group of words representing the associated key word.

In this implementation, a key word is representative of a segment if it appears at least twice in the segment.

For example, in the segment S1, the key word MC1 having the identifier Id1 is associated with the positions V1 and W1. In the segment S3, the key word MC2 having the identifier Id2 is associated with the positions V2 and W2. In the segment S7, the key word MC3 having the identifier Id3 is associated with the position V3.

The second part D22 contains the correspondences between the key words, to be more precise the correspondences between the key word identifiers.

For example, the correspondences of the identifiers Id2 and Id3 are in the part D22, signifying that the words MC2 and MC3 represent the same key word.

The third part D23 contains all of the extracts of the sound content CV represented in the form of quadruplets. Each quadruplet contains an extract start position in the sound content, its duration, a segment identifier and a key word identifier. The segment identifier and the key word identifier are empty or zero if the extract is not representative of a key word.

For example, the extract beginning at the position 11600 milliseconds (ms) and of duration 656 ms is representative of the key word in the segment S2 having the identifier Id2.

During playback of a segment of the sound content CV on one of the loudspeakers of the set of loudspeakers key words representative of the played back segment are displayed.

During playback of a segment of the sound content CV on one of the loudspeakers of the set of loudspeakers, key words of said segment, for example the key word MC2 for the segment S3, are read in the stored metadata file D2 and displayed on the screen E.

The current segment is highlighted.

If the currently spoken extract Zc represents the key word MC2, extracts Z2 and Z3 representing the key word MC2 are determined. The extract Z2 is determined by reading the part D21 of the metadata file D2 and the extract Z3 of the segment S7 is determined by reading the second part D22 of the metadata file D2.

The respective positions W2 and V3 of the extracts Z2 and Z3 are read in the metadata file D2.

The position V2 of the current extract Zc and the positions W2 and V3 of the extracts Z2 and Z3 are highlighted on the screen E.

Figure 7:
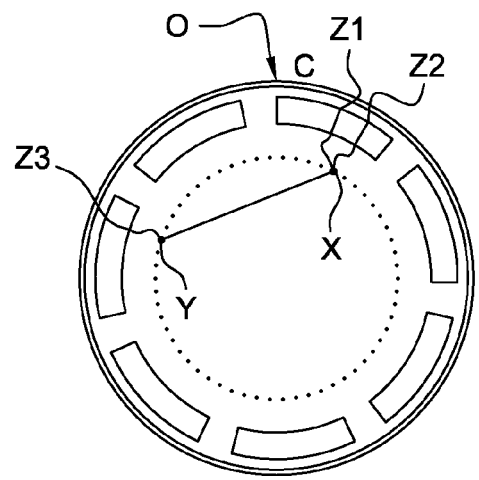
FIG. 7 shows a representation of a voice content obtained by means of a navigation method of a second implementation of the invention.

For example, as shown in FIG. 7, the highlighting consists in connecting the positions of the extracts Zc and Z2 to a point X representing the key word MC2, connecting the position V3 of the extract Z3 to a point Y representing the key word MC3 (equivalent to MC2), and connecting the points X and Y.

In parallel with playing back the sound content, the extract Z3 is played back on the loudspeaker associated with the segment S7 using a surround sound technique.

In the implementation described, the system comprises a set of seven loudspeakers geographically distributed on a circle around the screen.

Alternatively, the system SYS comprises a device D2 as described above and a headset for binaural playback. The loudspeakers of the playback system are then virtual loudspeakers of this binaural playback system.

One implementation of the sound spatialisation step is described below.

It is assumed that two key words have been detected for the spoken key word.

Thus there are three speech signals to be played back on three loudspeakers. The signal being played back is the primary signal. The other signals are secondary signals.

The primary signal is played back on one of the loudspeakers of the set of loudspeakers, this loudspeaker being selected as a function of the current position in the playback of the content. This primary signal is heard at an azimuth corresponding to its position on the sound representation circle.

The secondary signals are played back successively, in the order of their occurrence in the voice content, at the same time as the primary signal. This successive playback of the secondary signals make the played back signals, i.e. the primary signal and one of the secondary signals, more comprehensible to the user. The number of signals played back simultaneously is therefore limited to two.

The secondary signals are heard at an azimuth corresponding to their position on the sound representation circle.

Alternatively, the primary signal and the secondary signals are played back simultaneously.

The ratio of the direct field over the reverberant field for the secondary signals is reduced by a few decibels relative to the same field ratio for the primary signal. Apart from the effect of creating a sound level difference between the two sources, this produces a more stable sensation of distance and consequently backgrounds the secondary signals more noticeably.

The background effect thus imparted to the secondary signals also maintains greater intelligibility of the primary signal and reduces the auditory spread.

A second order high-pass filter is applied to the secondary signals. The cut-off frequency of this filter is in the range [1 kilohertz (kHz); 2 kHz], for example. The resulting limitation of the frequency overlap of the primary signal and the secondary signal makes it possible to distinguish between the played back signals in terms of timbre.

A process of desynchronizing the signals is also applied. This process determines whether the start of playback of a word of the primary signal coincides with the playback of a word of the secondary signal. If this moment coincides with an absence of secondary signal (gap between words), the time interval between the start of the played back word of the primary signal and the start of the word to be played back of the secondary signal is determined. If this time interval is below a predetermined threshold, playback of the word to be played back of the secondary signal is delayed. The predetermined threshold is preferably between 100 ms and 300 ms.

Alternatively, the signal desynchronizing process is not applied.

Highlighting the relationship between the positions of the same key word during sound playback facilitates navigation in the sound content by a user as a function of that user's interests.

Figure 8:
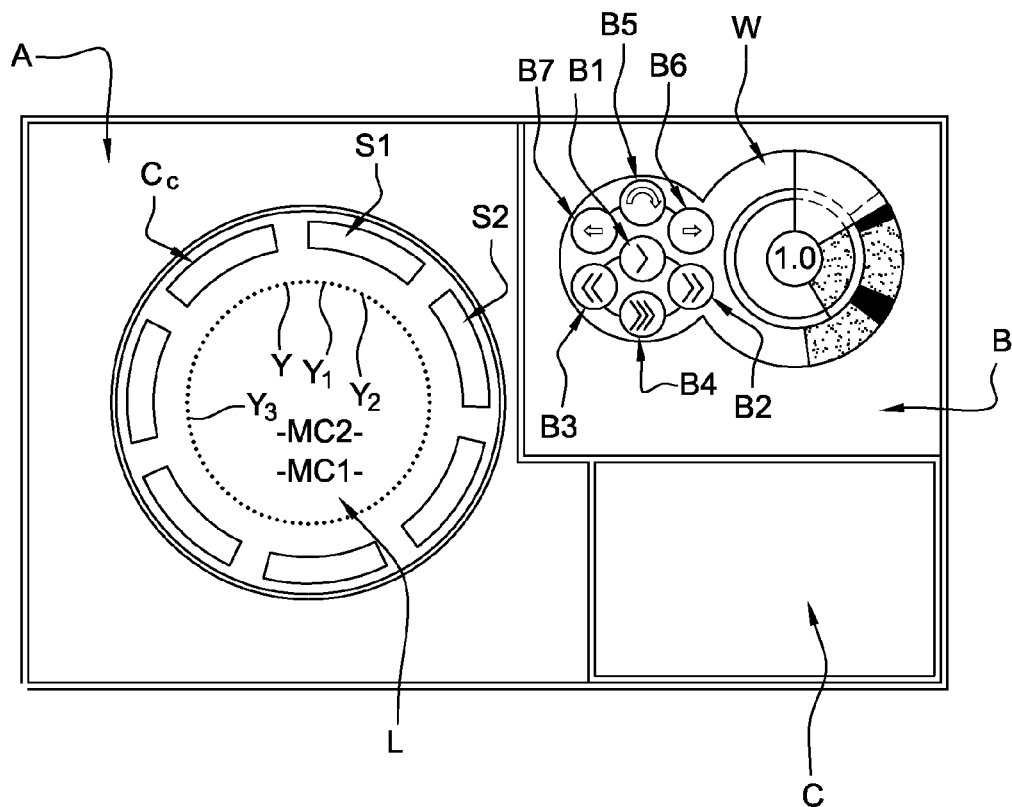
FIG. 8 shows an example of a graphical interface.

FIG. 8 shows an example of a graphical interface G making navigation possible in the sound content CV.

In a first window A, a circle Cc representing the voice content CV is displayed. The circle Cc is divided into segments S1, S2, etc. The key words or lemmas associated with the voice content CV are displayed in the form of a scrolling list L in the center of the circle Cc. Each key word of a segment is represented by a point Y situated along the circle Cc as a function of the position of the key word in the sound content.

For example, the key word MC1 displayed at the center of the circle is also represented by the points Y1, Y2, and Y3.

A second window B contains control buttons for reading and navigating in the sound content.

A button B1 commands reading.

A button B2 moves the cursor to the next key word. A button B3 moves the cursor to the previous key word.

A button B4 moves the cursor to the start of the next segment or the previous segment.

A button B5 selects a mode in which only the sentences containing key words are read.

A button B6 moves the cursor to the next instance of a key word.

A button B7 moves the cursor to the previous instance of a key word.

The cursor may also be moved to an instance of a key word by selecting a key word in the scrolling list with the mouse or using a touch-sensitive screen.

A graphical interface W also makes it possible to select the speed of reading the content.

A third window may contain information relating to the sound content, for example a date or a duration of the content.

Navigation within the sound content may also be effected by the user entering a movement on the display screen E, for example a circular arc one way or the other.

What is claimed is:

1. A method of navigating in a given sound content, wherein at least one key word is stored in association with at least two positions representative of said key word in the sound content, and wherein the method comprises the steps:

displaying a representation of the sound content;

during playback of the sound content, detecting that the current playback position corresponds to one of the positions previously stored;

obtaining a keyword stored in association with said current position and at least one second position as a function of the positions stored in association with said keyword; and highlighting the current playback position and the at least one second position in the representation of the sound content.

2. The navigation method according to claim 1, further comprising:

following reception of a user request, stopping the sound being played back followed by a step of playing back the content from the second position.

3. The navigation method according to claim 1, wherein playback of the currently spoken extract is followed by a step of playing back at least one determined extract.

4. The navigation method according to claim 1, wherein the sound content is represented in the form of a circle, a position on this circle representing a chronological position in the content, and wherein the highlighting step comprises a step of displaying a link between the first position and the second.

5. The navigation method according to claim 1, wherein the content is subdivided into segments and the representation of the content is a segmented representation and the highlighting step includes highlighting the segment containing the currently spoken extract and highlighting at least one segment containing at least one second extract.

6. The navigation method according to claim 5, wherein a represented segment is selectable via a user interface.

7. A method of navigating in a sound content, wherein at least one key word is stored in association with at least two positions representative of said key word in the sound content, the method comprising:

displaying a representation of the sound content back on a set of loudspeakers spaced apart around a circle;

playing back the sound content on a set of loudspeakers spaced apart around the circle;

during playback of the sound content, detecting a currently spoken extract representative of a key word previously stored at a first position;

determining at least one second extract representative of said key word and a second position as a function of the stored positions;

playing back the currently spoken extract on a first loudspeaker of the set of loudspeakers;

playing back the determined at least one second extract simultaneously on a second loudspeaker of the set, wherein the loudspeakers are selected as a function of the position of the at least one second extract on the circle representing the sound content; and highlighting the position of the extracts in the representation of the sound content by displaying a link between the first position and the second position.

8. The navigation method according to claim 7, wherein the loudspeakers are virtual loudspeakers of a binaural playback system.

9. The navigation method according to claim 7, wherein the sound level of the signal emitted by the first loudspeaker is greater than the sound level of the signal emitted by the second loudspeaker.

10. A device for navigating in a given sound content, wherein the device comprises:

a memory that stores at least one key word in association with at least two positions representative of said key word in the sound content;

a processor that:

displays a representation of the sound content;

detects that the current playback position corresponds to one of the positions previously stored;

obtains a keyword stored in association with said current position and at least one second position as a function of the positions stored in association with said keyword; and that highlights the current playback position and the at least one second position in the representation of the sound content.

11. The navigation system comprising a playback device according to claim 10 and at least two loudspeakers.

12. A non-transitory computer program product comprising instructions for executing the navigation method according to claim 1 when it is loaded into and executed by a processor.

* * * * *